US007660856B2

(12) United States Patent
O'Brien et al.

(10) Patent No.: US 7,660,856 B2
(45) Date of Patent: Feb. 9, 2010

(54) METHOD AND SYSTEM FOR WEB-BASED EVENT NOTIFICATION

(75) Inventors: Robert R. O'Brien, Kirkland, WA (US); John Thomas Wilcox, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 10/679,819

(22) Filed: Oct. 6, 2003

(65) Prior Publication Data

US 2005/0074098 A1    Apr. 7, 2005

(51) Int. Cl.
G06F 15/16 (2006.01)
(52) U.S. Cl. ............... 709/206; 709/207; 379/88.12; 379/88.17
(58) Field of Classification Search ........... 709/206, 709/207; 379/88.12, 88.17
See application file for complete search history.

(56) References Cited

U.S. PATENT DOCUMENTS

| | | | | |
|---|---|---|---|---|
| 5,333,266 | A * | 7/1994 | Boaz et al. ............... 709/206 |
| 5,889,839 | A * | 3/1999 | Beyda et al. ............ 379/88.12 |
| 5,912,951 | A * | 6/1999 | Checchio et al. ......... 379/88.22 |
| 5,963,618 | A * | 10/1999 | Porter ..................... 704/270.1 |
| 6,014,711 | A * | 1/2000 | Brown ....................... 709/245 |
| 6,161,185 | A * | 12/2000 | Guthrie et al. ................ 726/5 |
| 6,181,781 | B1 * | 1/2001 | Porter et al. ............ 379/88.17 |
| 6,282,270 | B1 * | 8/2001 | Porter ..................... 379/88.17 |
| 6,438,219 | B1 * | 8/2002 | Karau et al. ........... 379/112.01 |
| 6,563,912 | B1 * | 5/2003 | Dorfman et al. ......... 379/88.13 |
| 6,693,994 | B1 * | 2/2004 | Stern ........................ 379/67.1 |
| 6,771,949 | B1 * | 8/2004 | Corliss ....................... 455/413 |
| 7,277,529 | B1 * | 10/2007 | Wuthnow et al. ........ 379/88.14 |
| 2004/0121762 | A1 * | 6/2004 | Chou et al. ................. 455/413 |
| 2004/0264654 | A1 * | 12/2004 | Reding et al. ............ 379/88.12 |

OTHER PUBLICATIONS

"Ring Central Products: PhoneWorks 2002" (Dated: Sep. 30, 2002, accessed via www.archive.org at: <http://web.archive.org/web/20020603180111/ringcentral.com/products/pw2002.asp>), whole document.*
"BuzMe Plus 2.0," *Internet Telephony*, Jun. 2002, pp. 30-36.
Charles Pappas, "Communications—Tools and Technologies to Keep You Connected," *Home and Office Computing*, Apr. 2000, vol. 18, No. 4, 5 pages.

* cited by examiner

*Primary Examiner*—Dohm Chankong
*Assistant Examiner*—Thomas J Dailey
(74) *Attorney, Agent, or Firm*—Merchant & Gould; Ryan T. Grace (57) ABSTRACT

A method and system for using web services to notify a subscriber that an event has occurred at a voice mail switch and to retrieve the event is described. A notification server receives an event and an associated identifier from the voice mail switch. The identifier is correlated to a subscriber and an alert indicating that the event occurred is generated. The alert is sent to a destination selected by the subscriber. The alert includes an event reference that links the subscriber to the event through a network via a URL. The subscriber retrieves the event through a web portal view associated with the URL.

16 Claims, 6 Drawing Sheets

METHOD AND SYSTEM FOR WEB-BASED EVENT NOTIFICATION

FIELD OF THE INVENTION

The present invention relates generally to computers, and more particularly to using web services for notifying a subscriber that an event has occurred.

BACKGROUND OF THE INVENTION

Many telephone users commonly receive phone calls at different telephone numbers including residential wire lines, business wire lines and mobile lines. Each of these telephone numbers is often served by some kind of answering or voice mail system such that when an incoming call is not answered the caller can leave a message. Many residential lines have answering machines for recording the messages within their home. Business lines and mobile devices are commonly served by electronic voice mail systems.

A person who can be contacted at all of these various phone numbers must access each voice mail service and answering machine separately to access their messages. Accessing these different systems can be time inefficient especially if there are no voice mail messages to be retrieved. Voice mail retrieval would be simplified if the user could be notified of and access voice mail messages at a single source even though the messages are stored at different locations.

SUMMARY OF THE INVENTION

The present invention is directed at providing a system and method for using web services for notifying a subscriber that an event has occurred.

According to one aspect of the invention, a system for notifying a subscriber about an event comprises a voice mail switch and a notification server. The voice mail switch is configured to receive an event and an identifier associated with the event. The notification server is coupled to the voice mail switch. The notification server receives the event and the identifier from the voice mail switch, correlates the identifier with the subscriber, generates an alert, and sends the alert to the subscriber indicating that the event occurred.

According to another aspect of the invention, a method for notifying a subscriber about an event comprises: receiving an event and an identifier associated with the event; correlating the identifier with the subscriber; generating an alert; and sending the alert to the subscriber indicating that the event occurred.

According to yet another aspect of the invention, a system for notifying a subscriber about an event, comprises a means for receiving an event and an identifier associated with the event; a means for correlating the identifier with the subscriber; a means for generating an alert; and a means for sending the alert to the subscriber indicating that the event occurred.

DETAILED DESCRIPTION OF THE PREFERRED EMBODIMENT

The present invention is directed at providing a method and system for using web services for notifying a subscriber that an event has occurred at a voice mail switch and for retrieving the event. Briefly described, a notification server receives an event and an associated identifier from the voice mail switch. The identifier is correlated to a subscriber and an alert indicating that the event occurred is generated. The alert is sent to a destination selected by the subscriber. The alert includes an event reference that links the subscriber to the event through a network via a URL. The subscriber retrieves the event through a web portal view associated with the URL.

Figure 1:
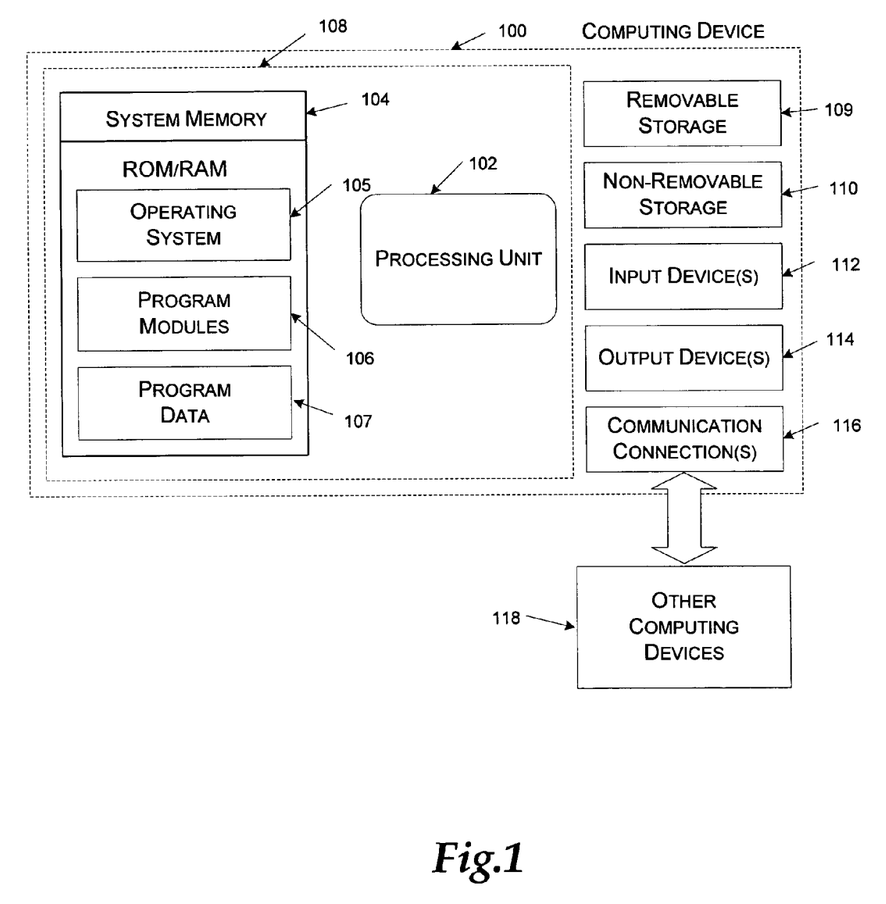
FIG. 1 is a functional block diagram of one computing device adapted to implement one embodiment of the invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
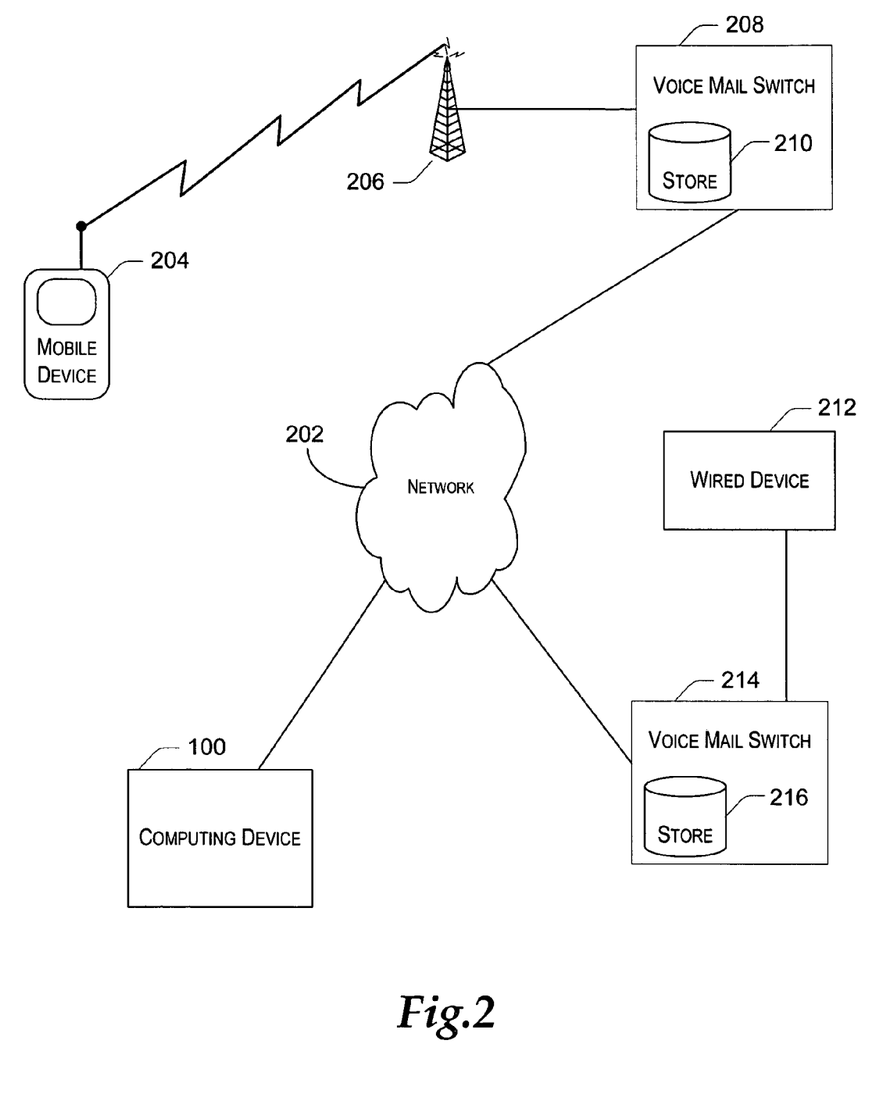
FIG. 2 is a functional block diagram illustrating a mobile device and a wired device connected to a computing device through a network.

FIG. 2 is a functional block diagram illustrating a mobile device and a wired device coupled to a computing device through a network in accordance with aspects of the present invention. Computing device 100 is coupled to network 202 through communication connection(s) 116. Computing device 100 can be a personal computer, a wireless device such as a personal digital assistant, or any device that allows a user to interact with other computing devices 118 through network 202. Mobile device 204 is coupled to network 202 through communications tower 206 and voice mail switch 208. Voice mail switch 208 includes a data store 210 for storing messages associated with mobile device 204. For example, data store 210 may be used to store voice mail messages intended for the user of mobile device 204. Wired device 212 is coupled to network 202 via voice mail switch 214. Voice mail switch 214 includes a data store 216 for storing messages, such as voice mail messages, intended for the user of wired device 212.

Voice mail switches 208, 214 are each part of a voice mail switch infrastructure provided by a voice mail service provider associated with telephone service carriers subscribed to by the user of mobile device 204 and the user of wired device 212. Data stores 210, 216 can be databases, or any other storage device that stores information in a proprietary format such that only authorized users can access the stored voice mail messages. When a voice mail message is received at voice mail switches 208, 214 and stored in data stores 210, 216, voice mail switches 208, 214 notify the subscriber of the voice mail service that a voice mail message has been received.

A subscriber is a person or application that has registered to receive alerts. A subscription is a request for specific information, such as a stock price or the score of a sporting event. The subscription also includes information about the destination where alerts are sent. An alert is a message that contains information related to a subscription. An alert might contain a message about a new high value for a specific stock or the final score for a sporting event. An event is a piece of information that a subscriber is interested in. For example, an event can include a stock price at a specific time, a sports score, a product delivery message, a fax, or telephone billing information. Almost any real-world occurrence can be expressed as an event. For explanatory purposes, the exemplary embodiments are described with reference to voice mail alerts. However, a subscriber may be notified of any event.

Voice mail switches 208, 214 include an event mechanism referred to as an event class. The subscriber can define event classes such that a set of rules are applied to incoming calls received at voice mail switches 208, 214. For example, the subscriber can stipulate that an alert is forwarded to a destination of the subscriber's choice when a voice mail message arrives at a voice mail switch.

Figure 3:
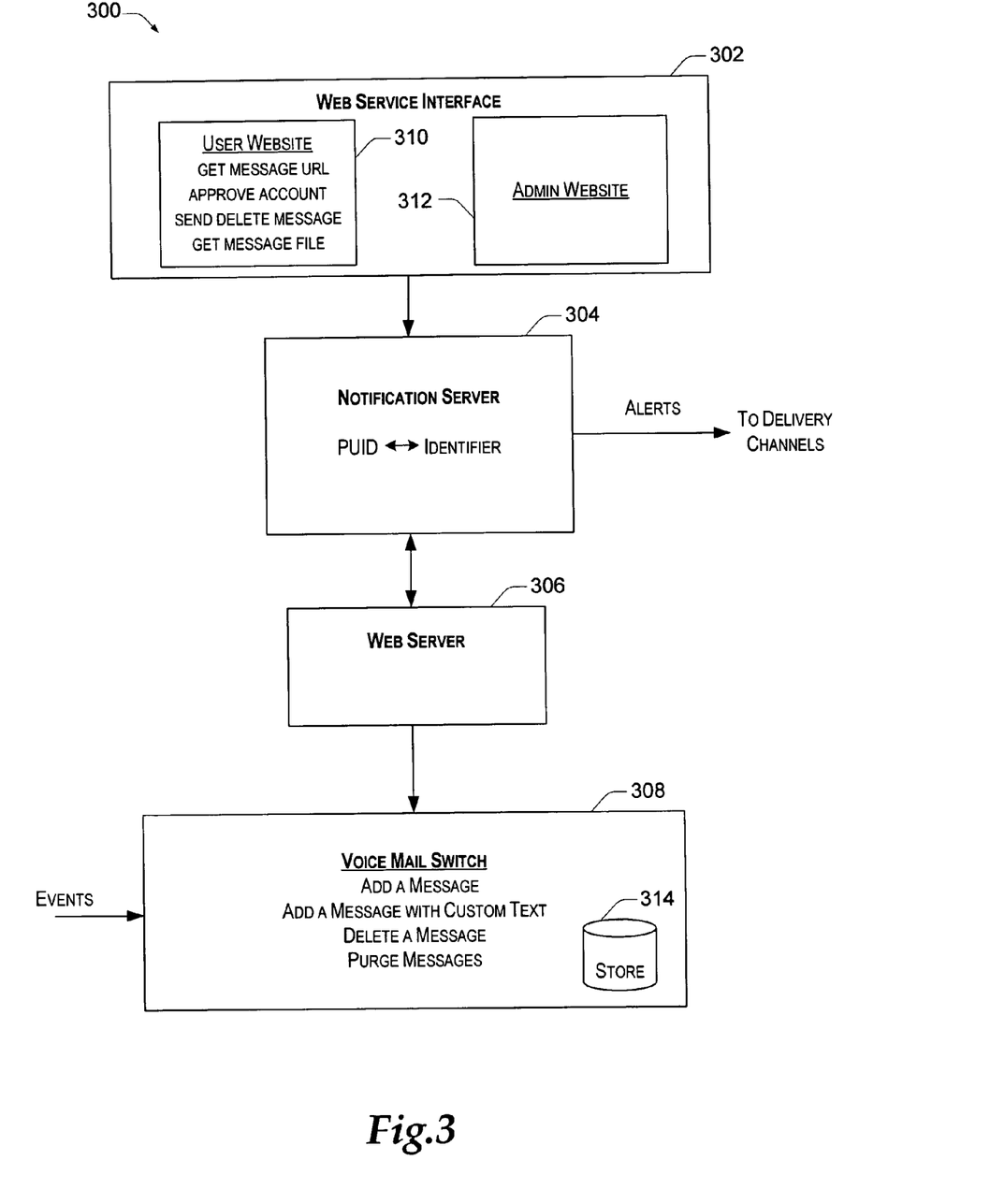
FIG. 3 is a functional block diagram of an alerts system for using web services for notifying a subscriber that an event has occurred at a voice mail switch.

FIG. 3 is a functional block diagram of an alerts system for using web services to notify a subscriber that an event has occurred at a voice mail switch, in accordance with aspects of the invention. Alerts system 300 includes web service interface 302, notification server 304, web server 306 and voice mail switch 308. Notification server 304 links web service interface 302 to web server 306. Web server 306 links voice mail switch 308 to notification server 304. Voice mail switch 306 can be part of any voice mail system that the subscriber's telephone carrier has in place. Voice mail switch 308 includes voice mail store 314.

Web service interface 302 includes user web site 310 and administrative website 312. User website 310 provides an interface to allow the subscriber to sign up for and configure alerts system 300. The opt-in aspect of alerts system 300 prevents carriers from sending unsolicited messages to those who have not subscribed to alerts system 300. The subscriber can register an authorized voice mailbox located at voice mail switch 308 by entering an identifier such as the phone number associated with the voice mailbox. According to one embodiment, the subscriber may also enter other unique data, such as an access code, to further prevent unauthorized use of the alerts service. The subscriber's personal information is stored in notification server 304. Notification server 304 generates a personal unique identifier (PUID) to identify the subscriber such that the PUID correlates to a corresponding identifier. After the subscriber has registered for the alerts service, the telephone carrier can perform access code verification for the addition of new voice mailboxes. User website 310 also provides an interface for cancellation of the alerts service.

Administrative website 312 provides an interface for an administrator, such as a customer service representative from the telephone carrier, to manage and report on registered accounts. The administrator can also perform other functions such as send custom alerts, inactivate a subscriber's account, and delete a registration.

Notification server 304 collects events and subscriptions, generates alerts, and then distributes the alerts to external delivery channels. The delivery channels use custom protocols to send the alerts to a destination designated by the subscriber. For example, the alerts may be sent to a computing device such as a personal computer. Notification server 304 receives input data from the subscriber via user website 310. The input data can include the identifier associated with the subscriber's voice mailbox, such as a telephone number, and any other authorization data.

When an event occurs at voice mail switch 308, such as the receipt of a voice mail message, the event is forwarded to notification server 304 through web server 306. Notification server 304 receives the event and determines who to notify by correlating the identifier associated with the event to the corresponding PUID associated with the subscriber. If a match is found, notification server 304 generates the alert and logs the event. Notification server 304 then determines if the subscriber has registered for the alerts service. If the service is enabled, the alert is sent through delivery channels that forward the alert to a destination designated by the subscriber. If a match is not found, notification server 304 logs the attempt to find a PUID match and discards the event.

Notification server 304 has a set of subscriber-defined settings that determine where the alerts are sent. For example, the subscriber can elect to receive alerts at a computer in the form of an instant message that appears as a pop-up window on the computer screen when the subscriber is on-line. If the subscriber is off-line, the subscriber can have the alerts forwarded to a voice mailbox that is accessed by a different number than the phone number associated with the voice mailbox where the message was left. Alternatively, the alerts can be deposited in the subscriber's e-mail inbox in the form of a text message. The alerts can be delivered to any destination by any communication method designated by the subscriber at web service interface 302.

Notification server 304 provides a link between the identifier associated with the event and the PUID associated with the subscriber. The telephone carrier uses the identifier, such as the subscriber's phone number, to identify an event. Notification server 304 uses the PUID to identify the subscriber. Notification server 304 is not aware of the subscriber associated with the identifier. When an event occurs at voice mail switch 308, notification server 304 correlates the identifier associated with the event to the corresponding PUID and then forwards the event to the PUID. Likewise, the telephone carrier does not store any PUID information. Thus, notification server 304 can bridge voice mail switch 308 to web service interface 302 by mapping the subscriber's telephone number to the corresponding PUID.

The telephone carrier and web service interface 302 each recognize the subscriber via different string values, i.e., a phone number and a PUID. This feature provides the subscriber with flexibility in customizing the alerts service because notification server 304 can map one or more phone numbers to one or more PUIDs. For example, the subscriber can receive alerts at one location for events occurring at many different voice mail switches. Likewise, a subscriber can receive the same alert at more than one location. Furthermore, multiple subscribers can be notified of the same event. For example, an entire family can be simultaneously notified of voice mail messages left at their residential line.

The subscriber can receive alerts regardless of geographic location. For example, a subscriber may only be able to access voice mail messages left on a voice mail switch associated with a mobile device while within an area that is served by a mobile service provider. The alerts system allows the subscriber to receive alerts at any geographic location where the web can be accessed.

After the alert is sent to the subscriber by the delivery channels, the subscriber can retrieve the event by an event reference that is included in the alert. The event reference contains unique identification information associated with the event stored at voice mail switch 308. The event reference can be used to locate and review the event. Knowledge of specific voice mail switch operation is not necessary for retrieval of the event. The event that triggered the voice mail switch that sent the alert to the subscriber is the voice mail switch accessed by the event reference.

The event reference can identify a URL associated with the alert such that the subscriber can access the event at voice mail store 314 through notification server 304. The subscriber clicks on the link at user website 310. Notification server 304 then maps the subscriber's personal information (phone number, PUID, etc.) to the URL associated with the message stored in voice mail store 314. The URL links the subscriber to a web portal view to review the event associated with the alert. If the alert was sent due to a voice mail message, the URL links the subscriber to a page where the voice mail message can be heard from user website 310. To reply to the message, the subscriber's computer can be used to return the phone call.

The subscriber can call on voice mail switch 308 through user website 310 to perform certain functions such as "add a message," "add a message with custom text," "delete a message," and "purge messages." Voice mail switch 308 can also call on the subscriber at user website 310 to perform certain functions such as "get message URL," "approve account," "send delete message," and "get message file."

The "add a message" function sends an alert to the subscriber with standard message notification text. The alert can be expressed as, "You've got a voice mail message from phone number 555-1234." According to one embodiment, the subscriber can create a phone book database such that a phone number corresponds to a caller label. When a new voice mail message is received, the phone number is mapped to the corresponding caller label to notify the subscriber of the caller who left the voice mail message. Thus, the alert can be expressed as, "You've got a voice mail message from John Doe."

The "add a message with custom text" function sends a custom alert to the subscriber. The subscriber can identify an event friendly name, an event reference and custom event text. For example, the subscriber can receive a custom alert such as "Today is your daughter's birthday", "You just received a fax", or "Your phone bill is ready for your review." This feature provides the subscriber with the flexibility to modify alerts to suit particular needs.

The "delete a message" function deletes a message from user website 310 at the request of the subscriber. The "purge messages" function deletes all messages from user website 310. The "send delete message" function sends a delete message request to voice mail switch 308 such that messages deleted or purged from user website 310 are also deleted from voice mail store 314.

The "get message URL" and "get message file" commands are used to format events that cannot be directly downloaded to the destination designated by the subscriber from voice mail store 314. As discussed above, when an event occurs at voice mail store 314, voice mail switch 308 notifies web service interface 302 to perform the "add a message" function. If the event is not in a format that is accessible to the subscriber at the destination where the alert was sent, web service interface 302 calls on voice mail switch 308 to retrieve the event. The "get message URL" function obtains the URL reference to a compatible encoded version of the event from voice mail store 314. The "get message file" function obtains a file reference to a compatible encoded version of the event from voice mail store 314. Web service interface 302 hosts the information that voice mail switch 308 calls on to encode the event into a format that can be understood at the destination where the alert was sent. The accessible event is then stored at web service interface 302. When an alert is received from the telephone carrier, the "get message URL" and "get message file" commands direct the subscriber to the appropriate voice mail switch based on the PUID associated with the subscriber regardless of the number of voice mail switches that a carrier may have in operation.

The "approve account" function validates the existence and status of a voice mail account, and approves the account for use with alerts system 300. The "approve account" function returns subscriber information from voice mail switch 308. For example, the "approve account" function can return an account identifier associated with the subscriber, i.e., accountId. The "approve account" function also provisions the necessary event filter on voice mail switch 308 that causes the "add a message" function to be called when new events occur at voice mail switch 308.

Figure 4:
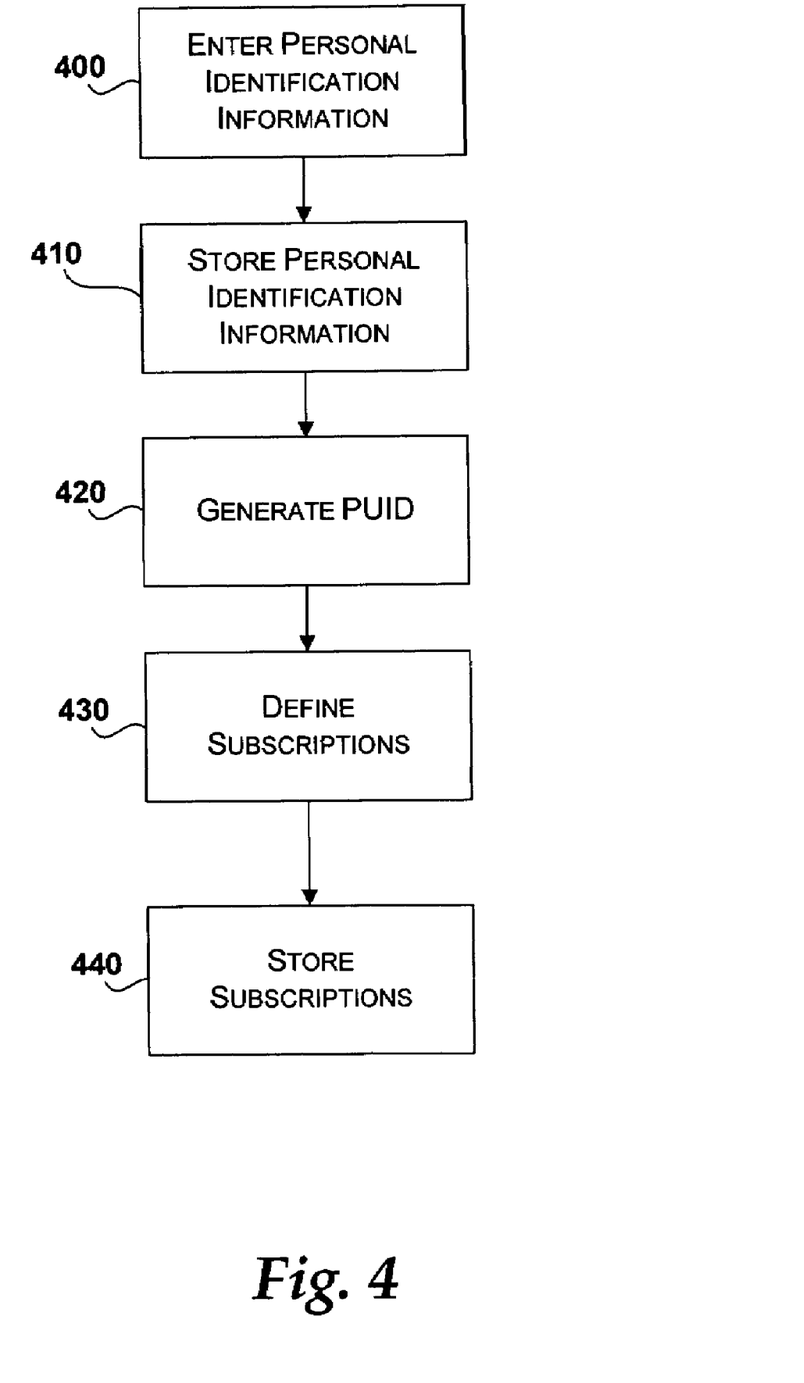
FIG. 4 illustrates a logical flow for registration and configuration of the alerts system of the present invention.

FIG. 4 illustrates a logical flow for registering for and configuring the alerts system of the present invention. The registration/configuration process begins at block 400 where a subscriber uses a web service interface to enter personal identification information to prove that the subscriber is authorized to receive the alerts. The personal identification information can include an identifier associated with a voice mail service, such as a phone number, or any other unique data such as an activation code. The personal identification information is stored in the notification server at block 410.

The notification server generates a PUID associated with the subscriber at block 420. The subscriber configures the alerts system by defining subscriptions at block 430. The subscriptions set forth which events occurring at the voice mail switch result in the generation of an alert. The subscriptions also determine where the alerts are sent. At block 440, the subscriptions are stored in the notification server.

Figure 5:
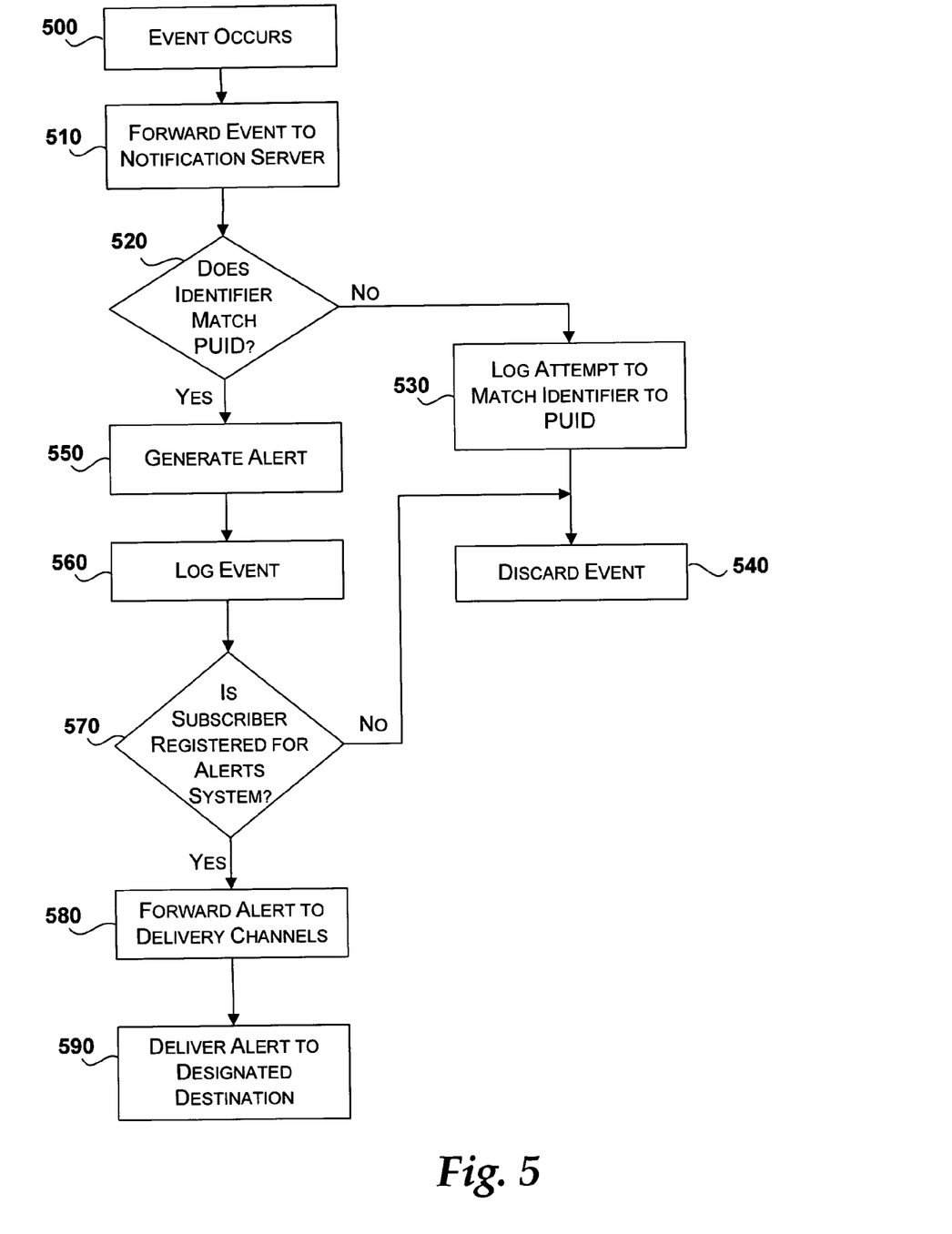
FIG. 5 illustrates a logical flow for notifying a subscriber that an event has occurred at a voice mail switch.

FIG. 5 illustrates a logical flow for notifying a subscriber that an event has occurred at a voice mail switch. The notification process begins at block 500 where an event occurs at the voice mail switch. The event is forwarded to the notification server at block 510.

The notification server attempts to match the identifier associated with the event to the PUID associated with the subscriber at decision block 520. If a match cannot be found, process control transfers to block 530. If a match is found, process control transfers to block 550. At block 530, the attempt to match the identifier to a PUID is logged in the notification server. The event is discarded at block 540.

After the notification server successfully matches the identifier associated with the event to the PUID associated with the subscriber, the notification server generates an alert at block 550. The notification server logs the event at block 560.

An inquiry is made to determine if the subscriber has registered for the alerts system at decision block 570. If the alert system has not been enabled, process control transfers to block 540 where the event is discarded. If the subscriber has registered for the alerts system, process control transfers to block 580. The alert is forwarded to delivery channels at block 580. The delivery channels deliver the alert to the destination designated by the subscriber during configuration of the alerts system at block 590. The delivery channels deliver the alert based on custom protocols.

Figure 6:
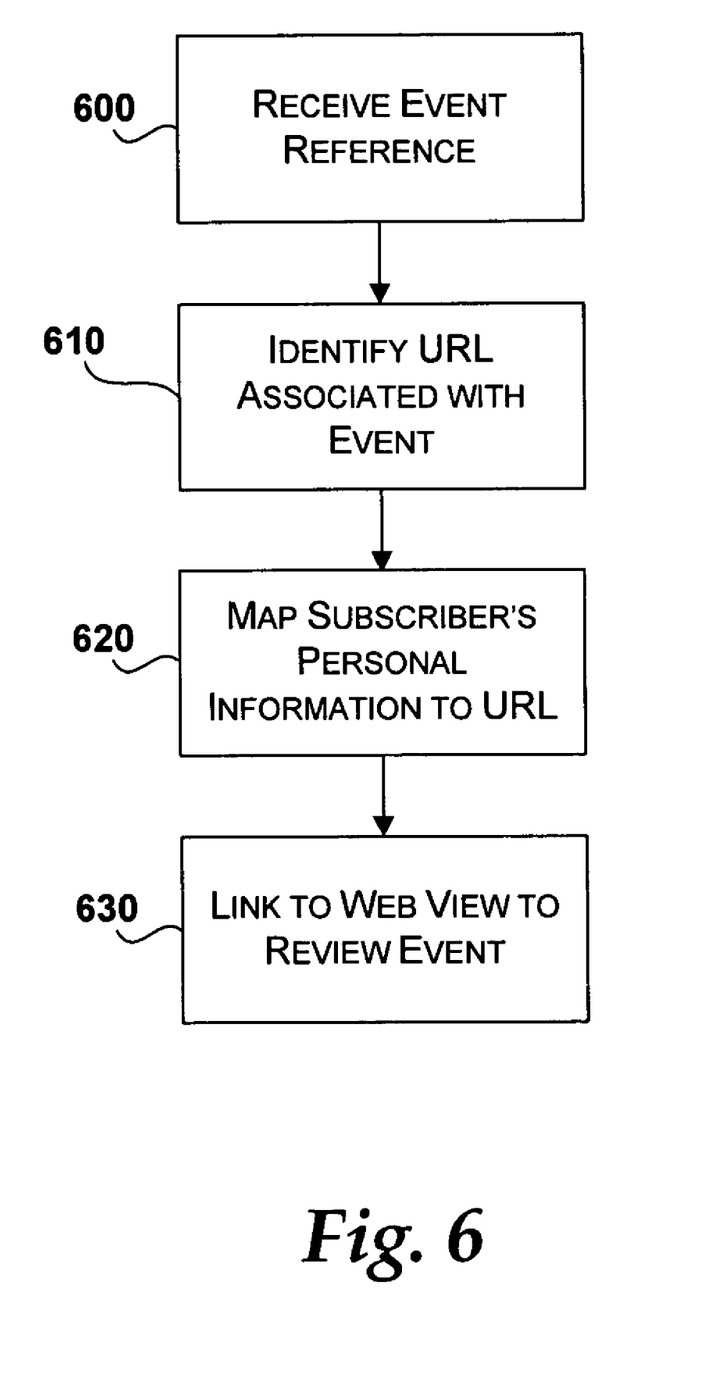
FIG. 6 illustrates a logical flow for retrieving an event that has occurred at a voice mail switch, in accordance with the present invention.

FIG. 6 illustrates a logical flow for retrieving an event that has occurred at a voice mail switch. The retrieval process begins at block 600 where the subscriber receives an event reference as a part of the alert. The event reference includes unique event identification information. The event reference identifies a URL associated with the event to locate the event at the voice mail switch at block 610. The notification server maps the subscriber's personal identification information to the URL associated with the event at block 620. The subscriber is linked to a web portal view to review the event associated with the event reference at block 630.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for notifying a subscriber about an event, the method comprising:
   receiving, on an internet notification server, phone voice mailbox registration information for a plurality of mailboxes, wherein at least one of the plurality of mailboxes is in communication with a different voice messaging switch than the other of the plurality of mailboxes;
   receiving, on the notification server, subscriber profile information, wherein the subscriber profile information includes at least one delivery channel;
   storing, on the notification server, the mailbox registration information and the subscriber profile information, wherein the mailbox registration information includes a mailbox identifier for each of the plurality of mailboxes;
   generating, by the notification server, a personal unique identifier (PUID) separate and independent of the received mailbox identifier and the received subscriber profile information, wherein the PUID provides a first mapping and a second mapping, wherein the first mapping maps the mailbox identifier to the PUID, wherein the second mapping maps the subscriber profile information to the PUID, wherein the PUID is an intermediary between the mailbox identifier and the subscriber profile information via the first and second mapping to disassociate the mailbox identifier from being a link to the subscriber profile information;
   receiving, on the notification server, a message event having a mailbox identifier;
   matching, on the notification server, the received mailbox identifier to one of the stored mailbox identifiers of the mailbox registration information;
   identifying the generated PUID from the first mapping;
   identifying the subscriber profile information from the second mapping;
   accessing the subscriber profile information based on the identified generated PUID;
   identifying the at least one delivery channel of the subscriber profile information;
   generating an alert on the notification server that identifies the messaging event; and
   sending the alert via the at least one communication channel indicated in the subscriber profile information that is identified by the generated PUID.

2. The computer-implemented method of claim 1, wherein the received mailbox identifier is matched to a second stored mailbox identifier to identify a second generated PUID that maps the second stored mailbox identifier with second subscriber profile information, wherein a second alert is sent via at least one communication channel indicated in the second subscriber profile information that is indicated by the second generated PUID.

3. The computer-implemented method of claim 1, further comprising:
   receiving, on the notification server, a plurality of message events association with a plurality of received mailbox identifiers, wherein each of the plurality of mailbox identifiers identifies at least one of the plurality of mailboxes associated with the mailbox registration information;
   matching, on the notification server, the received mailbox identifiers to the mailbox registration information to identify the generated PUID associated with the mailbox registration information;
   accessing the subscriber profile information associated with the generated PUID to identify a delivery channel associated with the subscriber profile information;
   generating a plurality of alerts on the notification server wherein each of the plurality of alerts identifies one of the plurality of message events; and
   sending the plurality of alerts via the delivery channel indicated in the subscriber profile information that is identified by the generated PUID.

4. The computer-implemented method of claim 1, wherein the notification server bridges a web server interface and the at least one of the plurality of mailboxes, wherein the notification server does not have access to the subscriber profile information and a telephone carrier associated with a messaging switch does not have access to the generated PUID.

5. A system for notifying a subscriber about an event, comprising:
   a plurality of voice mail switches, wherein each voice mail switch is configured to receive an event and a mailbox identifier associated with the event; and an internet notification server, coupled to the plurality of voice mail switches, wherein the notification server is configured to perform actions including:

receiving mailbox identifier information for a mailbox;

receiving subscriber profile information, wherein the subscriber profile information includes at least one delivery channel;

storing the mailbox identifier information and the subscriber profile information;

generating a personal unique identifier (PUID) separate from the received mailbox identifier and the received subscriber profile information, wherein the PUID provides a first mapping and a second mapping, wherein the first mapping maps the mailbox identifier to the PUID, wherein the second mapping maps the subscriber profile information to the PUID, wherein the PUID is an intermediary between the mailbox identifier and the subscriber profile information via the first and second mapping to disassociate the mailbox identifier from being a link to the subscriber profile information;

receiving a message event having a mailbox identifier;

matching the received mailbox identifier to the stored mailbox identifier;

identifying the generated PUID from the first mapping;

identifying the subscriber profile information from the second mapping;

accessing the subscriber profile information based on the identified generated PUID;

identifying the at least one delivery channel of the subscriber profile information;

generating an alert on the notification server that identifies the messaging event; and sending the alert via the at least one communication channel indicated in the subscriber profile information that is identified by the generated PUID.

6. The system of claim 5, wherein the alert includes an event reference that links the subscriber to the event such that the subscriber can retrieve the event through a web portal view associated with a URL.

7. The system of claim 5, further comprising a web service interface that is configured to allow the subscriber to register to receive the alert.

8. The system of claim 7, wherein the web service interface is further configured to allow the subscriber to designate at least one notification channel.

9. The system of claim 5, wherein the notification server is further configured to log the event after the alert is generated.

10. The system of claim 5, wherein the mailbox identifier is a telephone number associated with the event.

11. The system of claim 5, wherein the event is at least one of: a voice mail message, a stock price, a sports score, a product delivery message, a fax, and telephone billing information.

12. The system of claim 5, wherein the voicemail switch comprises a data store for storing the events.

13. A computer-readable storage medium having computer-executable instructions for notifying a subscriber about an event, the instructions comprising:

receiving, on a notification server, mailbox registration information for a mailbox;

receiving, on the notification server, first subscriber profile information and second subscriber profile information, wherein the first and second subscriber profile information includes at least one delivery channel;

storing, on the notification server, the mailbox registration information and the first and second subscriber profile information, wherein the mailbox registration information includes a mailbox identifier for the mailbox;

generating a first personal unique identifier (fPUID) separate from the received mailbox identifier and the received first subscriber profile information, wherein the fPUID provides a first mapping and a second mapping, wherein the first mapping maps the mailbox identifier to the fPUID, wherein the second mapping maps the first subscriber profile information to the fPUID, wherein the fPUID is an intermediary between the mailbox identifier and the first subscriber profile information via the first and second mapping to disassociate the mailbox identifier from being a link to the first subscriber profile information;

generating a second personal unique identifier (sPUID) separate from the received mailbox identifier and the received second subscriber profile information, wherein the sPUID provides a first mapping and a second mapping, wherein the first mapping maps the mailbox identifier to the sPUID, wherein the second mapping maps the second subscriber profile information to the sPUID, wherein the sPUID is an intermediary between the mailbox identifier and the second subscriber profile information via the first and second mapping to disassociate the mailbox identifier from being a link to the second subscriber profile information;

receiving, on the notification server, a message event having a mailbox identifier;

matching, on the notification server, the received mailbox identifier to the stored mailbox identifier identify the fPUID from the first mapping of the fPUID and identify the sPUID from the first mapping of the sPUID;

identify the first subscriber profile information from the second mapping of the fPUID and identify the second subscriber profile information from the second mapping of the sPUID;

accessing the first subscriber profile information based on the identified generated fPUID and accessing the second subscriber profile information based on the identified generated sPUID;

based on the generated fPUID, identifying the at least one delivery channel of the first subscriber profile information and based on the generated sPUID, identifying the at least one delivery channel of the second subscriber profile information;

generating an alert on the notification server that identifies the messaging event; and sending the alert via the at least one communication channel indicated in the first subscriber profile information that is identified by the generated fPUID and sending the alert via the at least one communication channel indicated in the second subscriber profile information that is identified by the generated sPUID.

14. The computer-readable storage medium of claim 13, further comprising:

linking the subscriber to the event through a network via a URL; and retrieving the event through a web portal view that is associated with the URL.

15. The computer-readable storage medium of claim 13, further comprising determining if the subscriber is registered to receive the alert.

16. The computer-readable storage medium of claim 13, further comprising logging the event.

* * * * *